(12) United States Patent
Stephenson et al.

(10) Patent No.: US 12,209,791 B2
(45) Date of Patent: Jan. 28, 2025

(54) CONDENSATE COLLECTION AND DISTRIBUTION SYSTEMS AND RELATED METHODS

(71) Applicants: Isabella Stephenson, Scottsdale, AZ (US); Blaze Claeson, Cave Creek, AZ (US); Cole Claeson, Cave Creek, AZ (US); Kennedy Claeson, Cave Creek, AZ (US); Johndavid Stephenson, Scottsdale, AZ (US); Clark Stephenson, Scottsdale, AZ (US); Anna Stephenson, Scottsdale, AZ (US); Adam Stephenson, Scottsdale, AZ (US)

(72) Inventors: Isabella Stephenson, Scottsdale, AZ (US); Blaze Claeson, Cave Creek, AZ (US); Cole Claeson, Cave Creek, AZ (US); Kennedy Claeson, Cave Creek, AZ (US); Johndavid Stephenson, Scottsdale, AZ (US); Clark Stephenson, Scottsdale, AZ (US); Anna Stephenson, Scottsdale, AZ (US); Adam Stephenson, Scottsdale, AZ (US)

( * ) Notice: Subject to any disclaimer, the term of this patent is extended or adjusted under 35 U.S.C. 154(b) by 1125 days.

(21) Appl. No.: 16/211,200

(22) Filed: Dec. 5, 2018

(65) Prior Publication Data
US 2020/0393189 A1    Dec. 17, 2020

Related U.S. Application Data

(60) Provisional application No. 62/594,740, filed on Dec. 5, 2017.

(51) Int. Cl.
*F25D 21/14* (2006.01)

(52) U.S. Cl.
CPC ................................... *F25D 21/14* (2013.01)

(58) Field of Classification Search
CPC ....................................................... F25D 21/14
(Continued)

(56) References Cited

U.S. PATENT DOCUMENTS

| 1,231,308 A | 6/1917 | Steelquist |
| 4,134,269 A | 1/1979 | Arzet |

(Continued)

FOREIGN PATENT DOCUMENTS

CN    103004556 A    4/2013

OTHER PUBLICATIONS

Unknown, 14 Best DIY Self-Watering Container Garden Ideas—Balcony Garden Web, Retrieved from the Internet: http://balconygardenweb.com/14-best-diy-self-watering-container-garden-ideas/, Downloaded on Nov. 27, 2017, 15 pages.

(Continued)

*Primary Examiner* — Filip Zec
(74) *Attorney, Agent, or Firm* — IPTechLaw

(57) ABSTRACT

A condensate collection and distribution system is disclosed. Specific implementations of condensate collection and distribution systems may include a pipe configured to be coupled to a condensate drainage pipe at a first end of the pipe, the pipe coupled to a condensation collection basin at a second end of the pipe, and an outlet in the collection basin, wherein the pipe is configured to transfer condensate from the condensate drainage pipe into the condensation collection basin using only a static pressure of condensate in the pipe.

16 Claims, 5 Drawing Sheets

(58) Field of Classification Search
USPC .................................................. 62/291–295
See application file for complete search history.

(56) References Cited

U.S. PATENT DOCUMENTS

| | | | | |
|---|---|---|---|---|
| 4,693,091 | A * | 9/1987 | O'Mara | F24F 13/22 137/59 |
| 4,918,940 | A * | 4/1990 | Buckley | F24F 13/22 62/272 |
| 5,267,412 | A * | 12/1993 | Bergin | A01G 29/00 47/48.5 |
| 5,341,653 | A * | 8/1994 | Tippmann | F25D 11/003 62/288 |
| 5,499,514 | A * | 3/1996 | Ho | F25D 17/047 62/291 |
| 6,289,688 | B1 * | 9/2001 | da Luz Moraes | F24F 1/027 62/298 |
| 6,437,851 | B2 * | 8/2002 | Hagiwara | G03F 7/70858 355/53 |
| 6,481,232 | B2 | 11/2002 | Faqih | |
| 6,550,264 | B1 * | 4/2003 | Cantolino | C02F 1/688 210/199 |
| 6,574,979 | B2 * | 6/2003 | Faqih | E03B 3/28 62/93 |
| 7,467,523 | B2 * | 12/2008 | Vetrovec | B01D 5/0066 62/272 |
| 7,854,238 | B2 | 12/2010 | Zatarain | |
| 8,321,061 | B2 | 11/2012 | Anderson | |
| 8,961,708 | B2 * | 2/2015 | Kaiser | B08B 9/032 134/166 C |
| 2006/0185733 | A1 | 8/2006 | McKee | |
| 2011/0061415 | A1 * | 3/2011 | Ward | F04B 49/04 700/282 |
| 2011/0308636 | A1 * | 12/2011 | Kaiser | F24F 13/222 137/101.27 |

OTHER PUBLICATIONS

AskJerry, Self Watering Garden—Using Recycled Water From an Air Conditioner: 7 Steps, Retrieved from the Internet: http://www.instructables.com/id/Self-Watering-Garden-Using-recycled-water-from-a/, Downloaded on Nov. 27, 2017, 15 pages.

* cited by examiner

CONDENSATE COLLECTION AND DISTRIBUTION SYSTEMS AND RELATED METHODS

CROSS REFERENCE TO RELATED APPLICATIONS

This document claims the benefit of the filing date of U.S. Provisional Patent Application 62/594,740, entitled "Condensate Collection and Distribution Systems and Related Methods" to Stephenson, et al. which was filed on Dec. 5, 2017, the disclosure of which is hereby incorporated entirely herein by reference.

BACKGROUND

1. Technical Field

Implementations of condensate collection systems relate to systems for collecting condensate from heating, ventilation, and air condition systems. Particular implementations also include systems for distributing the condensate.

2. Background

Condensate forms when air containing water vapor encounters a surface cool enough to cause the water vapor to condense into droplets on the surface. Condensation occurs in a variety of situations, including in heating, ventilation, and air conditioning (HVAC) air handlers which receive heat from water vapor containing air.

SUMMARY

Implementations of condensate collection and distribution systems may include: a pipe configured to be coupled to a condensate drainage pipe at a first end of the pipe, where the pipe may be coupled to a condensation collection basin at a second end of the pipe, an outlet in the collection basin, where the pipe may be configured to transfer condensate from the condensate drainage pipe into the condensation collection basin using only a static pressure of condensate in the pipe.

Implementations of condensate collection and distribution may include one, all, or any of the following:

At least one section of the pipe may be substantially parallel with the condensate drainage pipe, and both the pipe and the condensate drainage pipe are substantially vertical with a ground surface.

The outlet may include one of a spigot, a sprinkler, a drip distribution head, an irrigation pipe, a watering can head, a bubbler, or a pipe.

A bottom surface of the condensation collection basin may be at a desired height relative to the second end of the pipe.

The pipe may include a trap.

Implementations of condensate collection and distribution systems may include: a pipe configured to be coupled to a condensate drainage pipe at a first end of the pipe, where the pipe may be coupled to a condensation collection basin at a second end of the pipe, where at least one section of the pipe may be substantially parallel with the condensate drainage pipe, and both the pipe and the condensate drainage pipe are substantially vertical with a ground surface, and an outlet in the collection basin.

Implementations of condensate collection and distribution may include one, all, or any of the following:

The outlet may include one of a spigot, a sprinkler, a drip distribution head, an irrigation pipe, a watering can head, a bubbler, or a pipe.

The pipe may be configured to transfer condensate from the condensate drainage pipe into the condensation collection basin using only static pressure in the pipe.

A bottom surface of the condensation collection basin may be at a desired height relative to the second end of the pipe.

The pipe may include a trap.

Implementations of condensate collection and distribution systems may include: a pipe configured to receive a condensate drainage pipe and be coupled thereto. The pipe may have a first section coupled to the drainage pipe at a first end of the first section, a second section coupled to a second end of the first section at a first end of the second section, the second section extending substantially perpendicularly to a length of the first section, a third section coupled to a second end of the second section at a first end of the third section, the third section extending substantially perpendicularly to a length of the second section, and a fourth section coupled to a second end of the third section at a first end of the fourth section, the fourth section extending substantially perpendicularly to a length of the third section. A discharge section may be coupled at a second end of the fourth section.

Implementations of condensate collection and distribution may include one, all, or any of the following:

The first section, the second section, the third section, and the fourth section may each be coupled with each other using one of a plurality of elbow connectors.

At least one section of the pipe may be substantially parallel with the condensate drainage pipe, and both the pipe and the condensate drainage pipe are substantially vertical with a ground surface.

The pipe may be configured to transfer condensate from the condensate drainage pipe into the condensation collection basin using only static pressure in the pipe.

The discharge section may be configured to be coupled to a condensation collection basin.

The condensation collection basin may include a watering can.

The condensation collection basin may include an outlet, and the outlet includes one of a spigot, a sprinkler, a drip distribution head, an irrigation pipe, a watering can head, a bubbler, or a pipe.

The fourth section may include a trap.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended condensate collection and distribution systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such condensate collection and distribution systems, and implementing components and methods, consistent with the intended operation and methods.

Condensate from a Heating, Ventilation, and Air Conditioning (HVAC) system is created as the air around the cooling coils is cooled below its dew point, causing the water in the air passing over the coils to condense onto the pipes of the coils themselves. The water aggregates in drops on the coils, and is eventually collected in many systems using a drain pan which is drained to a drain line. The drain line carries the condensate away from the HVAC system. In residential housing, the condensate is collected in a drain pan below an air handler, and the drain line comes down from the drain pan within an exterior wall and has two exits out the exterior wall. The first exit pipe typically is about the length of the one story level on the building (10-12 feet) and is designed as an emergency bypass flow that receives water only if the main (lower) exit pipe, which exits the exterior wall at about 1-2 feet above ground level is plugged. During operation, particularly in the summer months, a constant dripping of condensate can be observed from the lower exit pipe of the drain.

In various implementations, the lower exit pipe typically exits the exterior wall substantially horizontally and terminates with a 90 degree elbow fitting which directs the condensate water downward. Since the condensate is continually flowing down the lower exit pipe and out onto the ground, there is no pressure head created by the flow, as the system is not designed to retain water in the pipe except in a trap in the pipe located near the drain pan. The trap is a curved section of the pipe designed to hold water and thus prevent insects and other debris from moving through the pipe into or out of the house through either exit pipe.

Figure 1:
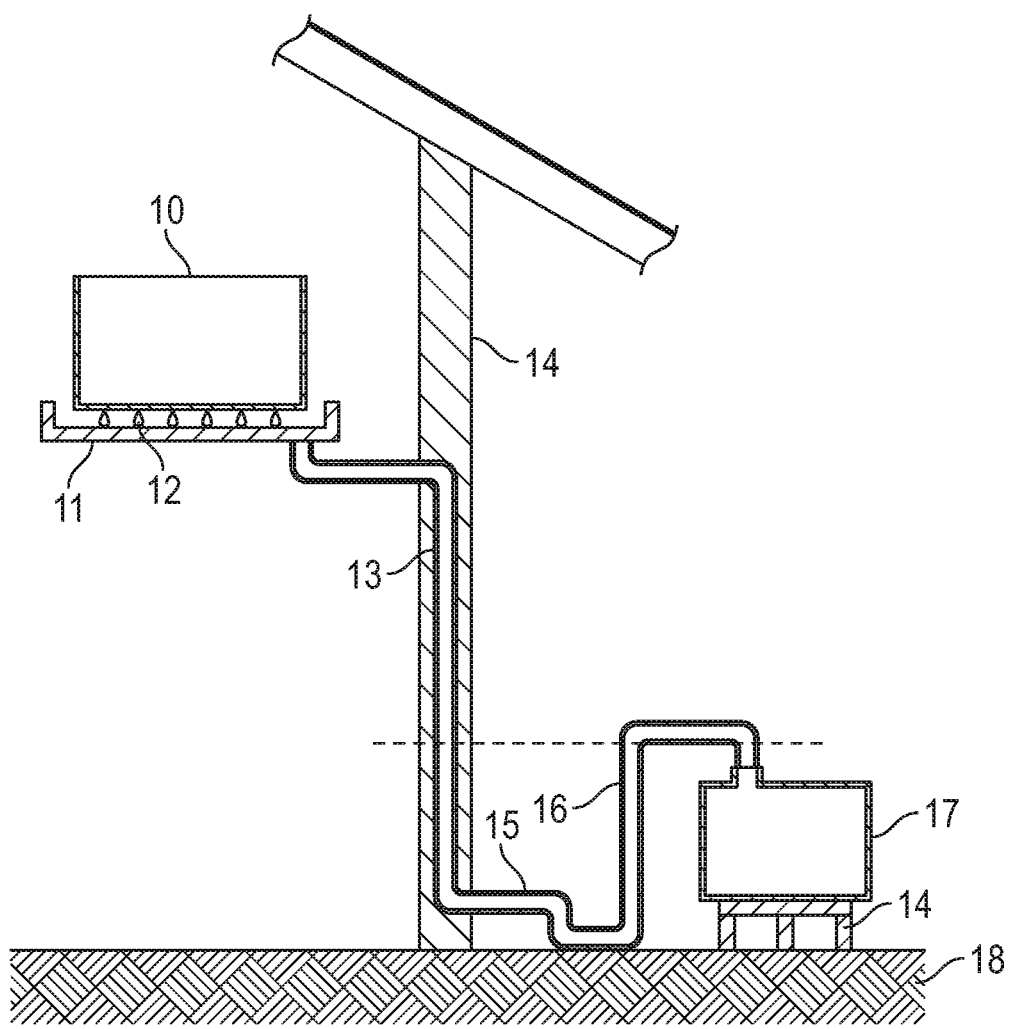
FIG. 1 illustrates an implementation of a cross sectional view of a condensate collection and distribution system.

Referring to FIG. 1, a cross sectional view of an implementation of a condensate collection and distribution system is illustrated. As illustrated, an air handler 10 of an HVAC system is positioned over a drain pan 11, and condensate 12 drips or flows from the air handler 10 and is collected within or on the drain pan 11. As illustrated, a drain line 13 is coupled to the drain pain 11 and carries the condensate 12 away from the air handler 10, and may be enclosed within a wall 14. In various implementation, by non-limiting example, the drain line 13 may be disposed outside the wall 14, or may be placed in any other area in relation to the air handler 10 or wall 14. As illustrated, the drain line 13 exits the wall 14 and may be coupled to a condensate drainage pipe 15.

As illustrated, the condensate drainage pipe 15 may be coupled to a pipe 16 at one end of the pipe 16. In various implementations, by non-limiting example, the pipe 16 may be made from ceramic, glass, fiberglass, metal, concrete, plastic, polyvinyl chloride (PVC), or any other material capable of transporting water. As illustrated, the pipe 16 may be coupled to a condensation collection basin 17 at the opposite end of the pipe 16 from the end coupled to the condensate drainage pipe 15. In various implementations, by non-limiting example, the pipe 16 is configured to transfer condensate 12 from the condensate drainage pipe 15 into the condensation collection basin 17 using only static pressure of the condensate 12 in the pipe 16 in combination with the corresponding static pressure of the condensate 12 in the condensate drainage pipe 15 in the wall 14. In various implementations, by non-limiting example, at least one section of the pipe 16 may be substantially parallel with the condensate drainage pipe 15, or the pipe 16 may be positioned in any other way relative to the condensate drainage pipe 15 so that a static pressure head may be developed. In various implementations, by non-limiting example, both the pipe 16 and the condensate drainage pipe 15 may be substantially vertical with a ground surface 18, or the pipe 16 and the condensate drainage pipe 15 may be positioned in any other way relative to the ground surface 18. As illustrated, the condensation collection basin 17 may be held up or in position at a height above the ground surface 18 by a support structure 19.

Figure 2:
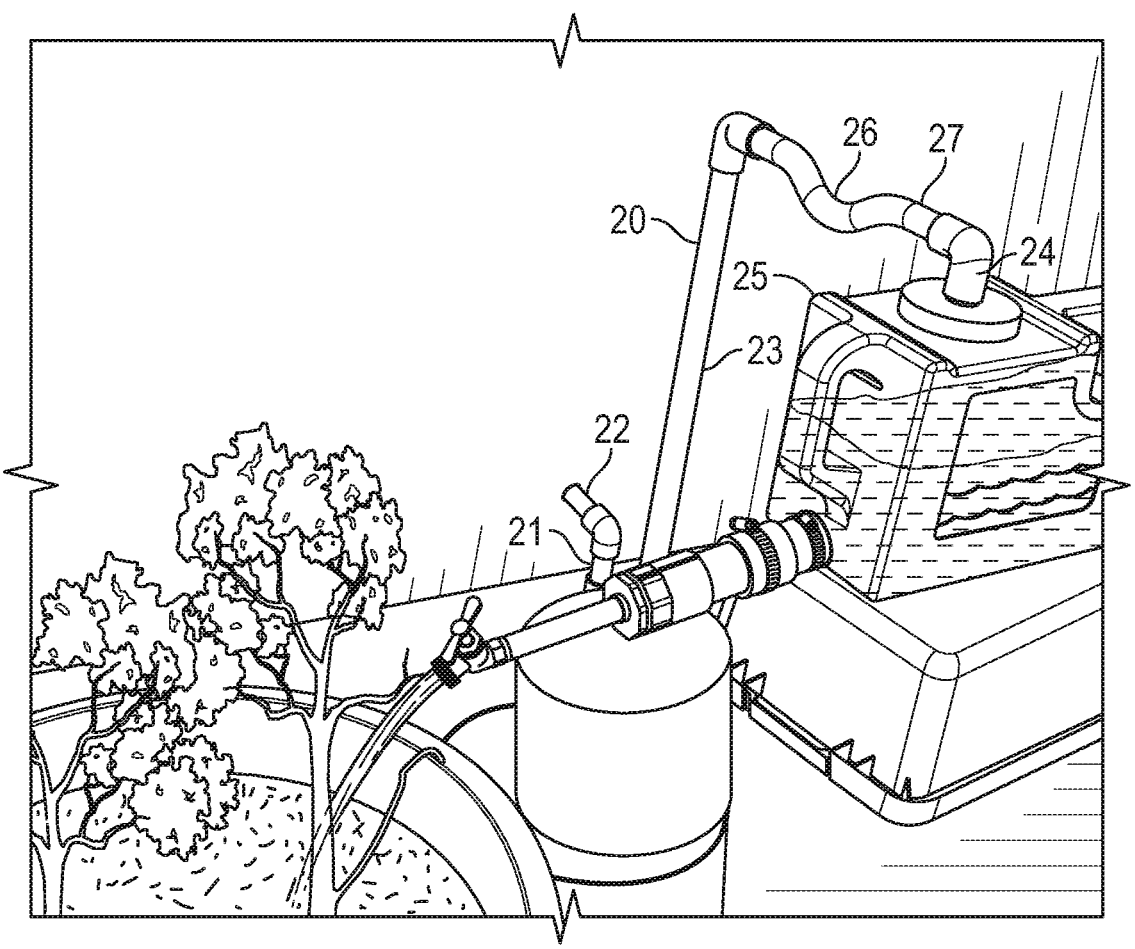
FIG. 2 illustrates an implementation of a condensate collection and distribution system.

Referring to FIG. 2, another implementation of a condensate collection and distribution system is illustrated. As illustrated, the system includes a pipe 20 includes a first section 21 which is configured to couple into the 90 degree elbow of a condensate drainage pipe 22. In various implementations, by non-limiting example, the sizing of the first section 21 may be sized to slidably engage into a sized 90 degree ¾ inch elbow that may be found on the condensate drainage pipe 22, or the first section 21 may be sized larger or smaller to accommodate the particular sizing of any type of condensate drainage pipe 22 from a residential or commercial HVAC system. Condensate from the first section 21 collects in that section and, as it continues to flow downwardly from a drain pan (see FIG. 1), the condensate begins to build up and move upwardly into a second section 23 of the pipe 20.

In various implementations, by non-limiting example, the drain pan is located in or on the roof area of a residential or commercial building, and is typically 10-12 or more feet above a ground surface. Because of this, in various implementations, by non-limiting example, the length of the second section 23 can be adjusted to create the desired pressure head of condensate for use in distributing the condensate. As illustrated in FIG. 2, the length of the second section 23 is about two feet. For this reason, when condensate has fully filled the second section 23, a column of water two feet high will be created in the second section 23. Correspondingly, a column of water two feet high now also is present within the condensate drainage pipe 22 inside the wall of the building. Referring to the dotted line in FIG. 1, because the height of both columns of water (the one in the condensate drainage pipe 22 and the one in the second section 23 of the pipe 20 are the same, any new condensate that drips into the column of water in the condensate drainage pipe 22 now flows through the first section 21, into the second section 23 and out a fourth section 24 of the pipe 20, where it is available for collection in a condensation collection basin 25. In this way, in various implementations, by non-limiting example, the condensate can be "lifted"

from the height of the first section 21 to the height of the fourth section 24 without the use of any pumping equipment. As the condensate flows out of the fourth section 24 of the pipe 20, the second section 23 may have a pressure head of two feet, rather than a pressure head of 6-8 inches, which may be the height of the first section 21 above the ground.

Still referring to FIG. 2, in various implementations, by non-limiting example, any desired pressure head up to the level of the drain pan itself in or on the roof could be generated simply by adjusting the length of the second section 23 of the pipe 20. In various implementations, where the second section 23 is greater than about 3 feet, various stabilizing brackets or structures could be employed to secure the second section 23 to the exterior wall to protect it against wind, the elements, or destabilization. In various implementations, by non-limiting example, the second section 23 may include one or more telescoping sections that permit the length of the second section 23 to be adjusted as desired. In various implementations, by non-limiting example, the telescoping sections may be rotationally tightenable to each other (as in some versions of telescoping legs) or they may include tightening portions that clamp the various sections against each other (as in some versions of camera tripods). In various implementations, by non-limiting example, various seals, rings and other devices may be employed to prevent water from exiting through the telescoping joints.

As illustrated in FIG. 2, in various pipe implementations, a trap 26 may be included in a third section 27 between the second section 23 and the fourth section 24 of the pipe 20. In various implementations, by non-limiting example, the fourth section 24 may be angled at 90 degrees, 45 degrees, or 180 degrees or any desired angle in between, depending on the type of condensation collection basin 25 used to receive the condensate from the pipe 20. Also, while as illustrated, the fourth section 24 directs all of the condensate flow downward, this may not be a case in other implementations. In these implementations, two or more openings/pipes may be included in the fourth section 24, a first one directing flow to the condensation collection basin 25 and the other, located above the first one, directing flow out of the condensation collection basin 25. In various implementations, by non-limiting example, this may be done as a safety measure to allow excess condensate to leave the system if the condensation collection basin 25 fills to capacity. In some implementations, this second opening/pipe may direct flow to another collection basin so that it can be filled.

Figure 3:
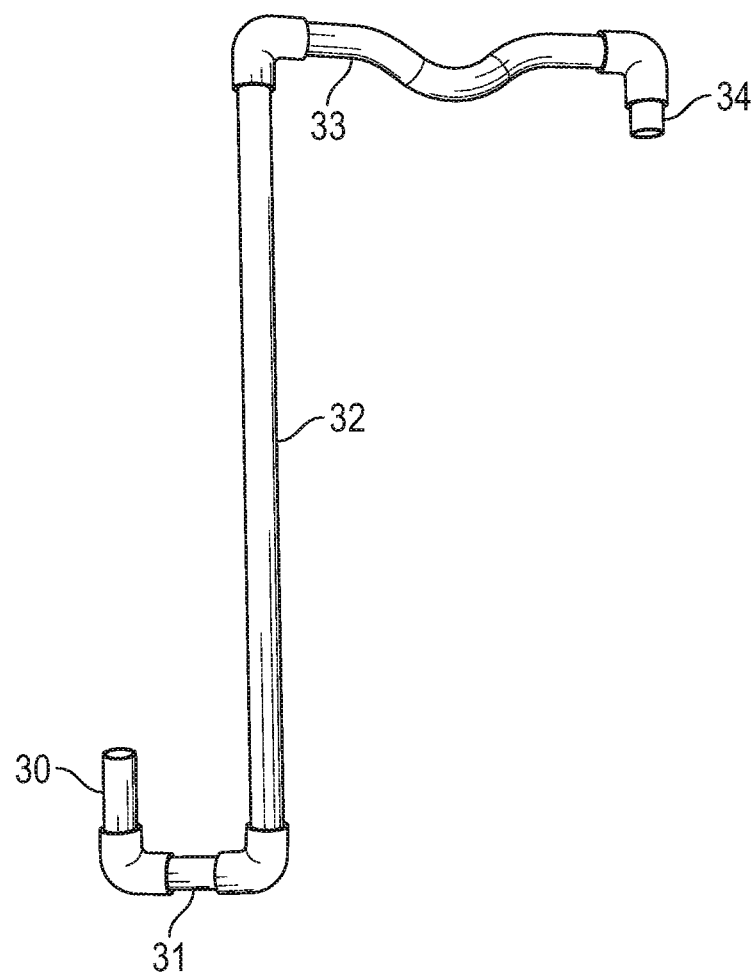
FIG. 3 illustrates an implementation of a pipe of a condensate collection and distribution system.

Referring to FIG. 3, an implementation of a pipe of a condensate collection and distribution system is illustrated. As illustrated, the pipe includes a first section 30, a second section 31, a third section 32, a fourth section 33, and a discharge section 34. In various implementations, the first section 30 is configured to couple to a condensate drainage pipe on one end and to a second section 31 at the other end. As illustrated, the other end of the second section 31 is configured to couple to one end of the third section 32. The other end of the third section 32 is configured to be coupled to one end of a fourth section. Finally, the other end of the fourth section is configured to be coupled to a discharge section 34. In various implementations, by non-limiting example, the second section 31 may extend substantially perpendicularly to a length of the first section 30. In various implementations, by non-limiting example, the third section may extend substantially perpendicularly to a length of the second section 31, and may be substantially parallel with a condensate drainage pipe. In various implementations, by non-limiting example, the fourth section 33 may extend substantially perpendicularly to a length of the third section 32. In various implementations, by non-limiting example, the discharge section 34 may be configured to couple to a condensation collection basin. As illustrated in FIG. 3, a trap may be included in the fourth section 33.

While the first section 30 may be configured to slidably couple into a condensate drainage pipe, in other implementations, the first section 30 may couple over the condensate drainage pipe using a fitting, or may join with or fit into or over the condensate drainage pipe using, by non-limiting example, a clamp, threads, flexible couplers, and any other method of coupling two portions together.

Still referring to FIG. 3, the second section 31 may be made of a variety of materials, such as, by non-limiting example, polyvinyl chloride (PVC), copper, steel, plastic, or any other material that can be shaped into a cylinder. The various sections of the pipe may be formed integrally (via casting, forming, molding, etc.) in various implementations or in various sections that are coupled together in various ways including, by non-limiting example, gluing, melting, welding, soldering, sliding, or any other technique for joining sections of material.

Figure 4:
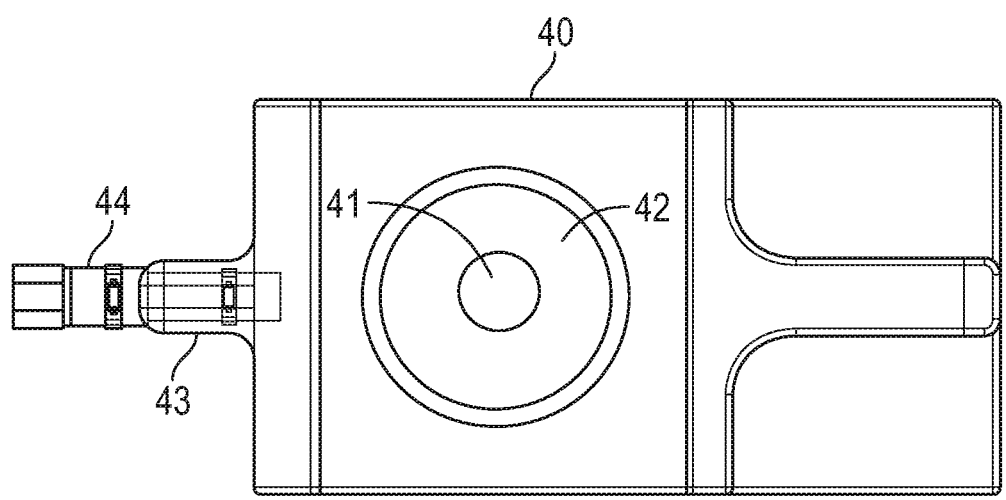
FIG. 4 illustrates an implementation of a condensate collection basin.

Referring to FIG. 4, an implementation of a condensate collection basin is illustrated. As illustrated, the condensate collection basin includes a condensation storage portion 40 an opening 41 in the top with a cap 42 in which the opening 41 was formed, and a side opening 43 to which a condensation distribution portion 44 has been coupled. In various implementations, by non-limiting example, any number of openings 41 and any number of sizes of condensation storage portions 40 could be used. In various implementations, by non-limiting example, the opening 41 may be configured to couple with a discharge section of a pipe. In various implementations, by non-limiting example, the condensation storage portion 40 may be configured to receive and to store condensation passed to the condensate collection basin from the discharge section of the pipe. In various implementations, by non-limiting example, the condensate collection basin could be made from materials such as plastic, glass, metal, or any other material. In various implementations, by non-limiting example, the condensate collection basin could be any shape to hold condensate, including cubic, cylindrical, conical, rectangular, or any other shape or size. In addition, by non-limiting example, the constituent elements of the condensate collection basin may be placed or positioned on any side or end of the condensate collection basin.

Figure 5:
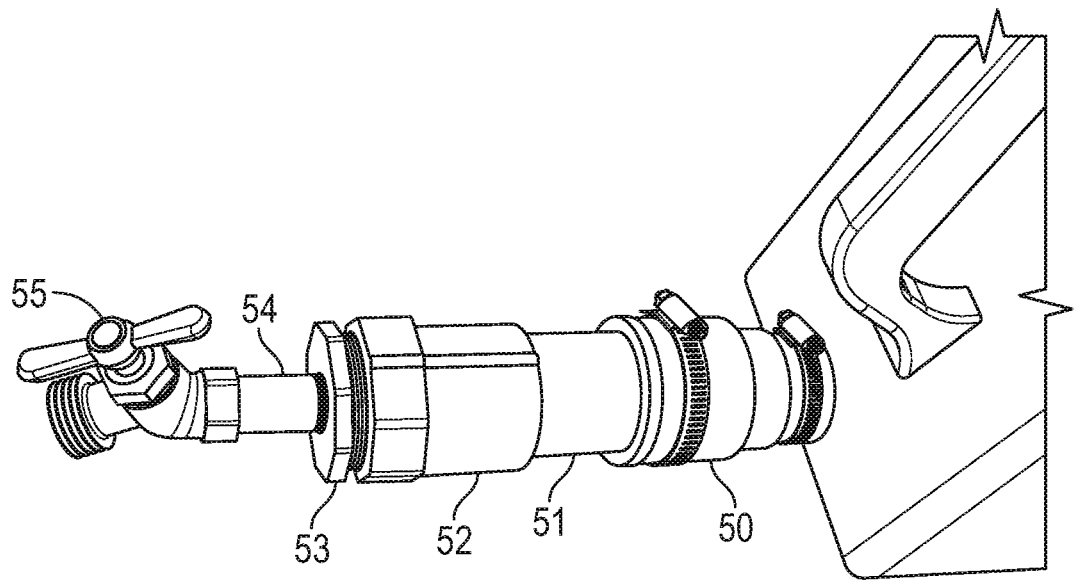
FIG. 5 illustrates an implementation of an outlet of a condensate collection basin.

Referring to FIG. 5, an example outlet of a condensate collection basin is illustrated. As illustrated, a sleeved fitting 50 is used to transition the condensate from the condensate collection basin to the diameter of transition portion 51. In various implementations, by non-limiting example, pipe clamps may be used to hold the sleeved fitting 50 in place, or any other clamp, fitting, or sealing device or system may be used. In various implementations, by non-limiting example, various sealant compounds may be used to water seal the fittings. As illustrated, a threaded fitting 52 is glued to the transition portion 51 into which a threaded reducer 53 is used to allow the diameter of the transition portion 51 to be reduced to a smaller diameter threaded transition 54. The smaller diameter threaded transition 54 is then coupled with a control valve 55, which, in various implementations and, as illustrated, by non-limiting example, may be a hose bib fitting. A wide variety of possible fitting types may be employed to reduce, increase, or change ends of the various components of the outlet in various implementations. The control valve 55 allows the condensate collection basin to retain sufficient condensate to develop sufficient pressure to allow the subsequent outlet components to work effectively (such as sprinkler or drip components). In various implementations, however, the control valve 55 may be eliminated and the various outlet components may be directly coupled to the threaded transition 54, meaning that the condensate flow will be continuous or semi-continuous. A wide variety of control valves may be employed in various implementations other than hose bib types.

Figure 6:
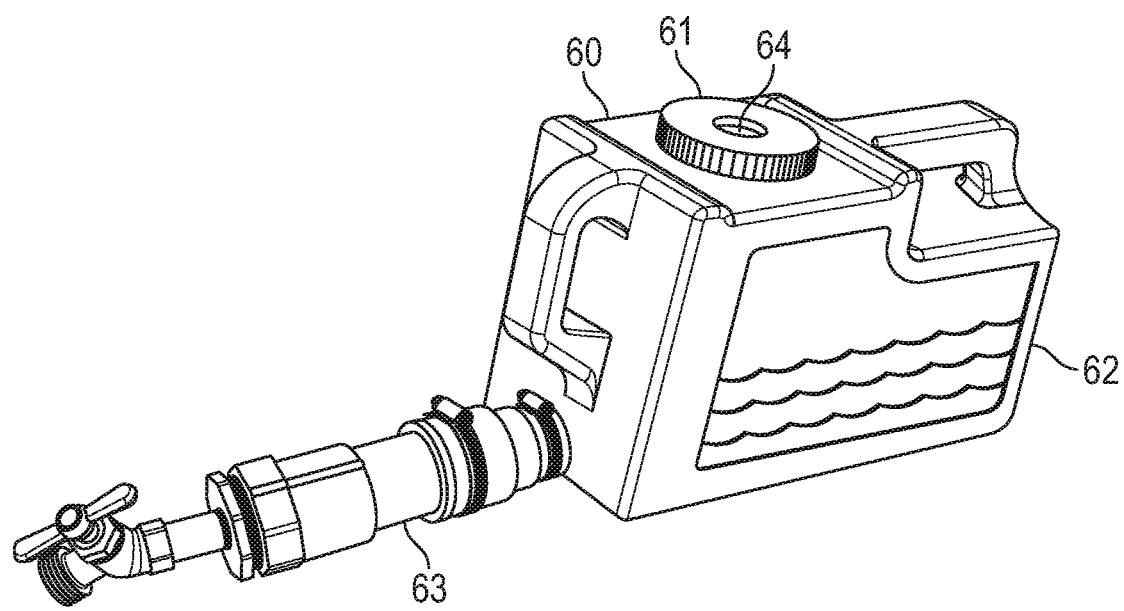
FIG. 6 illustrates an implementation of a condensate collection basin with an outlet.

Referring to FIG. 6, a condensate collection basin with an outlet is illustrated. As illustrated, the condensate collection basin 60 includes a water receiving portion 61, a water storage portion 62, and a water distribution portion 63. As illustrated, the water receiving portion 61 includes an opening 64 designed to couple with a discharge section of a pipe. In the implementation illustrated, the opening 64 is designed to receive the end of the discharge section; in other implementations, the discharge section may be coupled with the water receiving portion 61 using any of the coupling systems or components disclosed herein. The water storage portion 62 may be any of a wide variety of vessels like any disclosed herein and may contain a wide variety of openings therein. Because the pressure head is best developed if the bottom surface of the water storage portion 62 is kept close to the level of the discharge section of the pipe, the ultimate height of the water storage portion 62 above the a ground surface may be an important consideration in forming the design. Because the water storage portion 62 encloses the stored condensate, temporary and/or periodic distribution of the condensate at rates greater than the inflow of the condensate is possible. The water distribution portion 63 is used to control the outflow of the condensate from the water storage portion 62 using various techniques.

The water storage portion 62 may be supported at a desired height above the ground surface using various techniques and structures and supports. Multiple water storage portions 62 may be employed in various implementations both directly coupled to each other and not directly coupled to each other. Where multiple water storage portions 62 are used, they may be separable/isolatable from each other to allow them to be removed for water distribution activities and then replaced.

Figure 7:
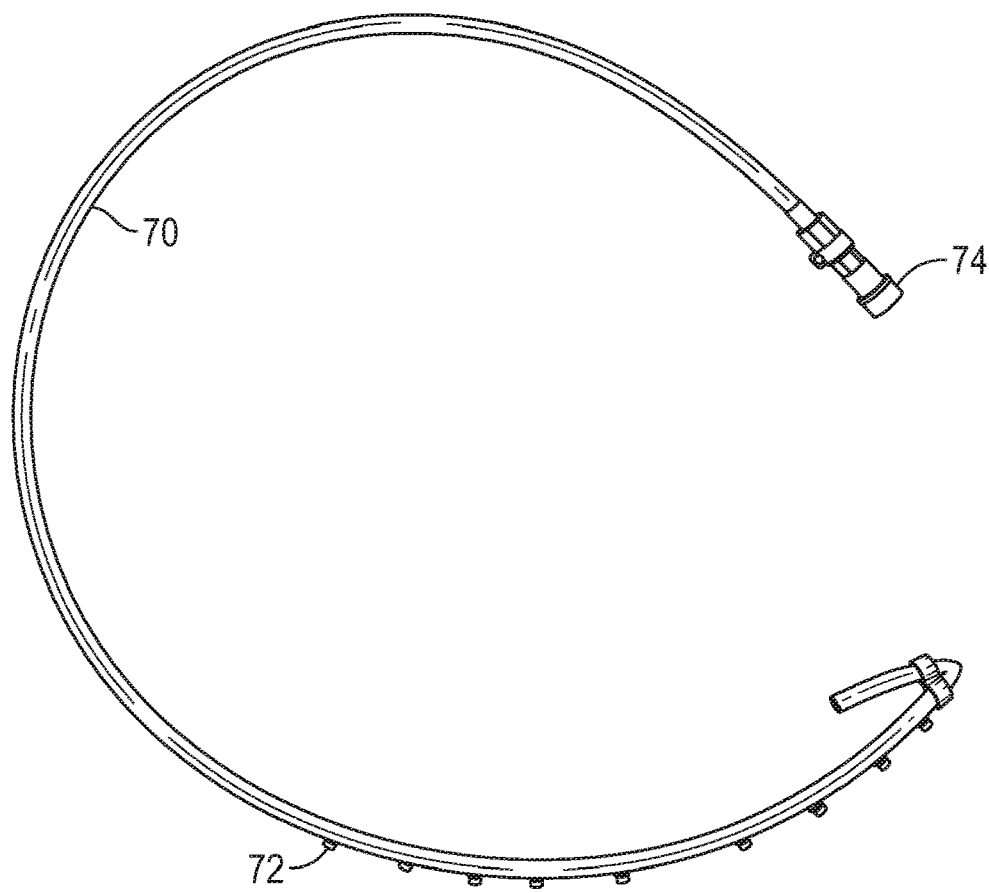
FIG. 7 illustrates an implementations of a drip distribution tube outlet.

Referring to FIG. 7, an example drip distribution tube outlet is illustrated. As illustrated, the drip distribution tube outlet includes a ½ inch irrigation pipe 70 with a plurality of drip heads 72 thereon with a threaded fitting 74 designed to couple to a control valve of a condensate collection basin and distribute water through the drip heads 72. Examples of other water distribution components that may be employed in various implementations include, by non-limiting example, drip sprinkler heads, sprinkler heads, watering can heads, drip heads, bubblers, pipes of various diameters, and any other device capable of manually or automatically distributing water.

Figure 8:
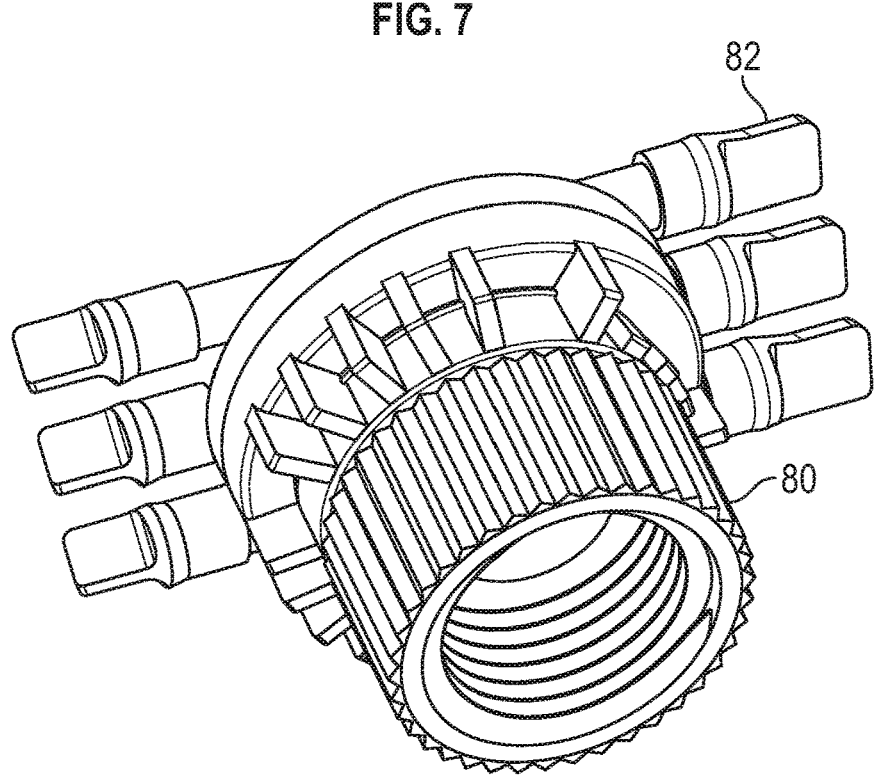
FIG. 8 illustrates an implementation of a sprinkler outlet.

Referring to FIG. 8, an example distribution outlet is illustrated. The distribution outlet may be designed to couple to a control valve of a condensate collection basin by a threading 80. As illustrated, the distribution outlet may include a plurality of outlets 82 designed to couple with ¼ inch drip tubing. In various implementations, by non-limiting example, drip heads may then be coupled drip lines coupled with each of the plurality of outlets to distribute condensate.

In places where the description above refers to particular implementations of a condensate collection and distribution system and implementing components, sub-components, methods and sub-methods, it should be readily apparent that a number of modifications may be made without departing from the spirit thereof and that these implementations, implementing components, sub-components, methods and sub-methods may be applied to other condensate collection and distribution systems.

What is claimed is:

1. A system for collecting condensate comprising:
    a pipe configured to be coupled at a first end of the pipe to a condensate drainage pipe comprising a substantially horizontal section, the pipe coupled to a condensation collection basin at a second end of the pipe; and
    an outlet in the condensation collection basin;
    wherein the pipe is configured to transfer condensate from the condensate drainage pipe from a section of the pipe located, relative to a ground surface, above the substantially horizontal section of the condensate drainage pipe into the condensation collection basin using only a static pressure of condensate in the pipe.

2. The system of claim 1, wherein a section of the pipe is oriented substantially vertically with the ground surface and is also oriented substantially parallel with a section of the condensate drainage pipe that is oriented substantially vertically.

3. The system of claim 1, wherein the outlet comprises one of a spigot, a sprinkler, a drip distribution tube, an irrigation pipe, a watering can head, a bubbler, a sprinkler, or a pipe.

4. The system of claim 1, wherein a bottom surface of the condensation collection basin is at a desired height relative to the second end of the pipe.

5. The system of claim 1, wherein the pipe comprises a trap.

6. A system for collecting condensate comprising:
    a pipe configured to be coupled at a first end of the pipe to an end of a condensate drainage, the pipe coupled to a condensation collection basin at a second end of the pipe, wherein the second end of the pipe is located, relative to a ground surface, above the end of the condensate drainage pipe; and
    an outlet in the condensation collection basin;
    wherein the pipe is configured to transfer condensate from the condensate drainage pipe into the condensation collection basin using only static pressure in the pipe.

7. The system of claim 6, wherein the outlet comprises one of a spigot, a sprinkler, a drip distribution tube, an irrigation pipe, a watering can head, a bubbler, a sprinkler, or a pipe.

8. The system of claim 6, wherein a bottom surface of the condensation collection basin is at a desired height relative to the second end of the pipe.

9. The system of claim 6, wherein the pipe comprises a trap.

10. A system for collecting condensate comprising:
    a pipe configured to receive a condensate drainage pipe and be coupled thereto, the pipe comprising:
        a first section coupled to the condensate drainage pipe at a first end of the first section;
        a second section coupled to a second end of the first section at a first end of the second section, the second section extending substantially perpendicularly to a length of the first section;
        a third section coupled to a second end of the second section at a first end of the third section, the third section extending substantially perpendicularly to a length of the second section;

a fourth section coupled to a second end of the third section at a first end of the fourth section, the fourth section extending substantially perpendicularly to a length of the third section; and a discharge section coupled at a second end of the fourth section and located, relative to a ground surface, above the first end of the first section, the discharge section configured to transfer condensate from the condensate drainage pipe using only static pressure in the pipe.

11. The system of claim 10, wherein the first section, the second section, the third section, and the fourth section are each coupled with each other using one of a plurality of elbow connectors.

12. The system of claim 10, wherein at least one section of the pipe is substantially parallel with the condensate drainage pipe, and both the pipe and the condensate drainage pipe have at least one section that is substantially vertical with a ground surface.

13. The system of claim 10, wherein the discharge section is configured to be coupled to a condensation collection basin.

14. The system of claim 13, wherein the condensation collection basin comprises a watering can.

15. The system of claim 13, wherein the condensation collection basin comprises an outlet, the outlet comprising one of a spigot, a sprinkler, a drip distribution tube, an irrigation pipe, a watering can head, a bubbler, a sprinkler, or a pipe.

16. The system of claim 10, wherein the fourth section comprises a trap.

* * * * *